US006791499B2

(12) United States Patent
Nakamura et al.

(10) Patent No.: US 6,791,499 B2
(45) Date of Patent: Sep. 14, 2004

(54) ELECTRONIC APPARATUS AND ANTENNA INSTALLATION METHOD

(75) Inventors: Hiroshi Nakamura, Ome (JP); Hiroyuki Minaguchi, Higashimatsuyama (JP); Toshiyuki Hirota, Hino (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/310,846

(22) Filed: Dec. 6, 2002

(65) Prior Publication Data

US 2003/0133281 A1 Jul. 17, 2003

(30) Foreign Application Priority Data

Jan. 16, 2002 (JP) ........................................ 2002-007749

(51) Int. Cl.[7] ................................................ H01Q 1/24
(52) U.S. Cl. ...................................... 343/702; 343/872
(58) Field of Search ........................ 343/702, 700 MS, 343/846, 873, 872; H01Q 1/24

(56) References Cited

U.S. PATENT DOCUMENTS

| 5,262,792 | A | 11/1993 | Egashira |
| 5,300,938 | A | 4/1994 | Maroun et al. |
| 5,684,672 | A | 11/1997 | Karidis et al. |
| 6,040,804 | A | 3/2000 | Harano |
| 6,285,328 | B1 | 9/2001 | Masaki et al. |
| 6,295,207 | B1 | 9/2001 | Jones |
| 2002/0024469 | A1 | * 2/2002 | Masaki ........................ 343/702 |
| 2002/0024470 | A1 | * 2/2002 | Meng et al. ................. 343/702 |
| 2002/0118135 | A1 | * 8/2002 | Johnson et al. .............. 343/702 |
| 2003/0122726 | A1 | * 7/2003 | Abbasi et al. ............... 343/846 |

FOREIGN PATENT DOCUMENTS

EP 0 706 232 A2 4/1996

OTHER PUBLICATIONS

Minaguchi, H. et al., "Electronic Apparatus Having Antenna Elements For Use In Wireless Communication", U.S. application No. 10/045,066, filed Jan. 15, 2002.

* cited by examiner

*Primary Examiner*—Hoanganh Le
(74) *Attorney, Agent, or Firm*—Finnegan, Henderson, Farabow, Garrett & Dunner, L.L.P.

(57) ABSTRACT

Antenna elements for a wireless unit provided in a housing body are sandwiched between a housing base and a housing cover. The size and thickness of the apparatus housing are thus reduced, and the structure of installing the antenna elements is simplified into an economically advantageous structure. The antenna elements are provided, with the surfaces of their antenna patterns all exposed from the side walls of the housing body. It is hence possible to realize an antenna unit with stable and high performance without being electromagnetically influenced by components installed in the housing.

15 Claims, 4 Drawing Sheets

ELECTRONIC APPARATUS AND ANTENNA INSTALLATION METHOD

CROSS-REFERENCE TO RELATED APPLICATIONS

This application is based upon and claims the benefit of priority from the prior Japanese Patent Application No. 2002-007749, filed on Jan. 16, 2002, the entire contents of which are incorporated herein by reference.

BACKGROUND OF THE INVENTION

1. Field of the Invention

The present invention relates to an electronic apparatus comprising a wireless unit which performs wireless communication with an external apparatus such as a portable computer. The present invention also relates to a method of installing an antenna, for use in the electronic apparatus comprising the wireless unit.

2. Description of the Related Art

The notebook personal computers with a wireless communication function adopt a structure in which an antenna element for a wireless unit projects from the housing body of the apparatus, considering directivity and radiation characteristics of the antenna element. Alternatively, an antenna element is provided in the housing of a display section which is supported rotatably by the housing body.

The antenna installation structures as described above, however, have the following problems.

In the former structure in which the antenna element projects from the main housing, the part of the antenna that projects from the housing is an obstacle to the handling of the whole apparatus, resulting in poor usability.

In the latter structure in which the antenna element is provided in the housing of the display section, the coaxial cable which connects the wireless unit provided in the housing body to the antenna element provided in the housing of the display section supported rotatably by the housing body is long. This has the drawback of a large signal loss. If a coaxial cable having a large diameter is used to reduce the signal loss, smooth rotation of the display housing is hindered and the apparatus housing is thickened, impairing easy portability.

In each of the antenna installation mechanisms as described above, an antenna container section for installing an antenna element is molded into the housing body or the display housing. Further, the antenna element is fixed with screws at a predetermined position in the container section using a special tool. Problems caused herefrom are the large size of the apparatus due to occupation by the space for installing (containing) the antenna in the housing, the complicated structure, and the increase in costs for products.

BRIEF SUMMARY OF THE INVENTION

An embodiment of the present invention is to provide an electronic apparatus and an antenna installation method capable of installing an antenna element for a wireless unit in a structure, which is economically advantageous and has advantageous antenna performance, without involving an increase in the size of the housing, in an electronic apparatus with a wireless unit.

According to an aspect of the present invention, there is provided an electronic apparatus comprising: a housing including a lower case and an upper case; and an unit having an antenna element provided between a side wall of the lower case and a side wall of the upper case.

According to another aspect of the present invention, there is provided an electronic apparatus comprising: a housing including a lower case and an upper case; and an unit having an antenna element sandwiched between the lower and upper cases.

According to still another aspect of the present invention, there is provided a method for installing an antenna for an electronic apparatus having a housing body which is comprised of a base and a cover and contains a wireless unit, the method comprising: forming one of the base and cover from conductive material; and installing an antenna element of the wireless unit between the base and cover in one side wall of the housing body, and adjusting the electrostatic capacitance between the antenna element and conductivity of the housing body by the cover covering the antenna element.

Also, according to still another aspect of the present invention, there is provided an electronic apparatus comprising: a housing including an upper case and a lower case; and a wireless unit including an antenna element inside the housing, wherein one of the upper and lower cases is made of conductive material, and the one of the upper and lower cases, which is made of conductive material, serves as a ground plane for antenna element.

DETAILED DESCRIPTION OF THE INVENTION

Embodiments of the present invention will now be described with reference to the drawings.

Described first will be the first embodiment of the present invention with reference to FIGS. 1 to 4.

Figure 1:
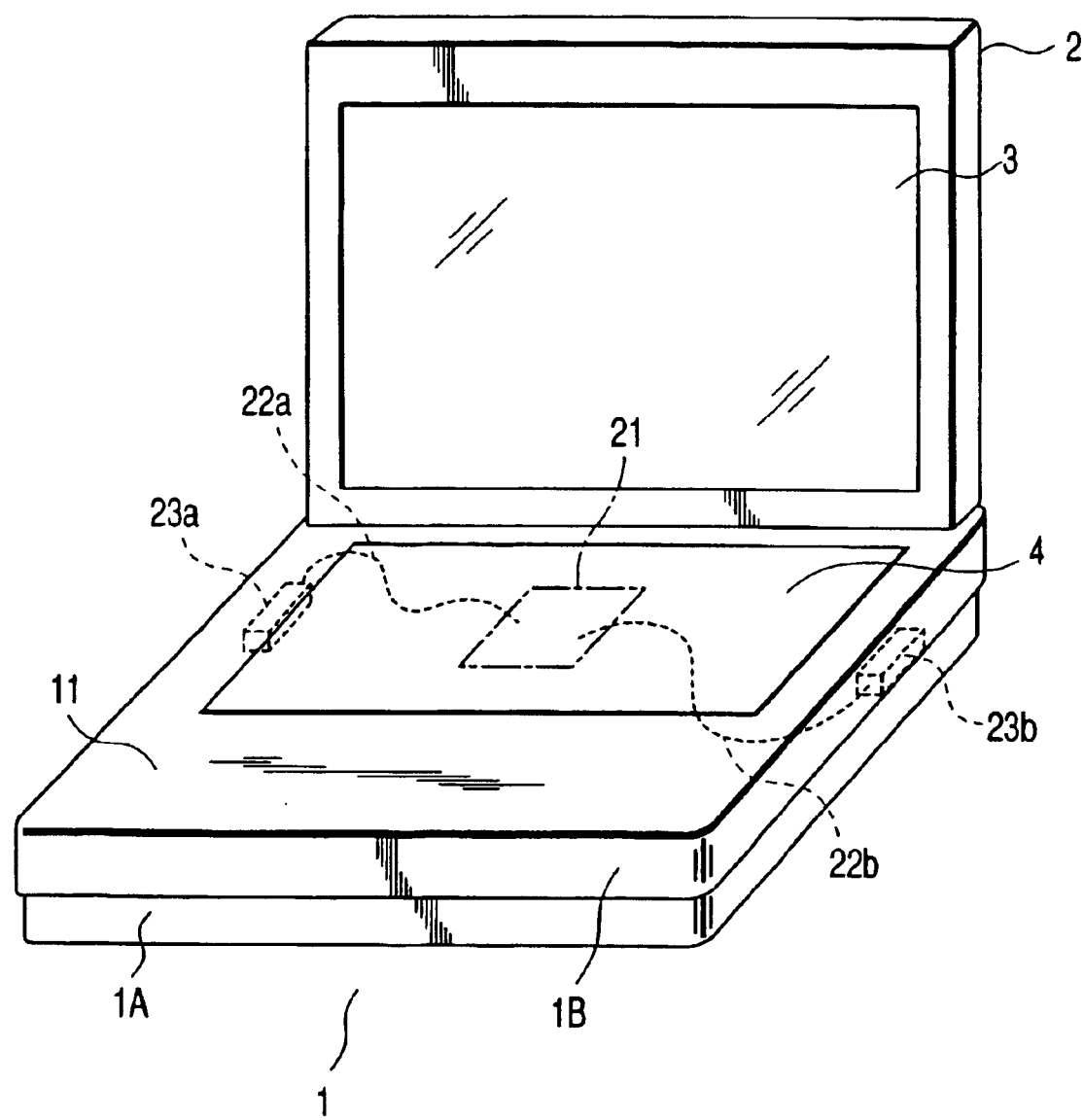
FIG. 1 is a perspective view showing the whole structure of an apparatus according to a first embodiment of the present invention.

FIG. 1 is a perspective view showing a structure of an electronic apparatus according to the first embodiment of the present invention. In this embodiment, a notebook personal computer is exemplified as the electronic apparatus in which a display housing 2 is provided to be rotatable on a housing body 1.

The housing body 1 is comprised of a housing base (or a lower case) 1A and a housing cover (or an upper case) 1B each of which is made of conductive material. A main circuit board including a wireless unit 21 is installed inside the housing body 1. The wireless unit 21 may have a structure in which the wireless unit 21 is fixed (as standard equipment) to the housing body 1, or another structure in which the wireless unit 21 is installed as an optional device when necessary. The display housing 2 is provided with an LCD panel 3. The housing cover 1B is provided with a keyboard 4. A part of the upper surface of the housing cover 1B is used as a palm rest 11.

In the left and right side walls of the main housing body 1, antenna elements 23a and 23b are each sandwiched between the housing base 1A and the housing cover 1B. By this sandwiching, the antenna elements 23a and 23b are installed in the housing body 1. The antenna elements 23a and 23b are connected to the wireless unit 21 via coaxial cables 22a and 22b, respectively.

Figure 2:
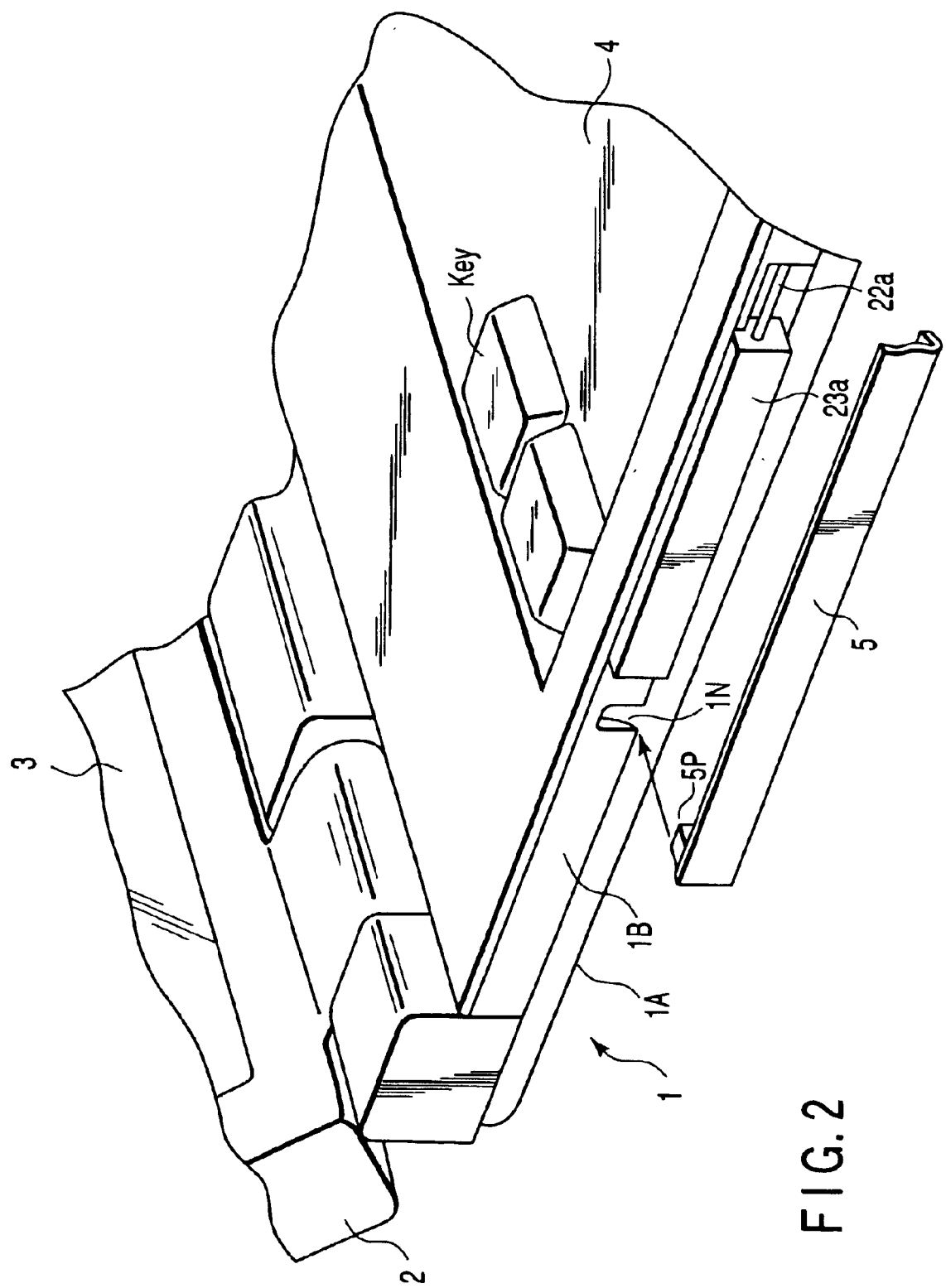
FIG. 2 is an enlarged perspective view showing a part of the structure of installing antenna elements in the embodiment.
Figure 3:
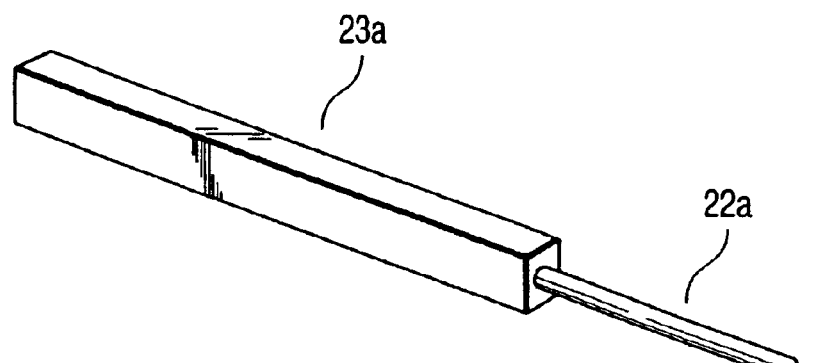
FIG. 3 is a perspective view showing an outer appearance of an antenna element in the embodiment.
Figure 4:
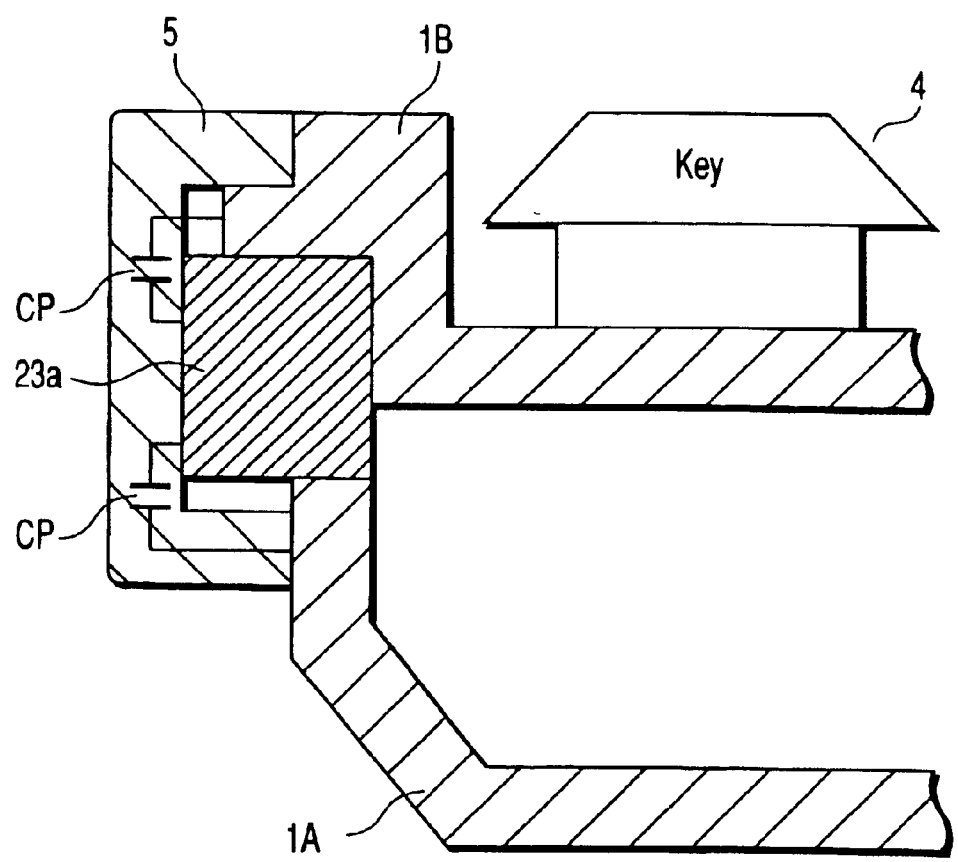
FIG. 4 is a cross-sectional view showing the structure of a main part in the embodiment.

FIG. 2 is an enlarged perspective view showing the installation structure of the antenna element 23a. FIG. 3 is a perspective view showing an outer appearance of the antenna element 23a. FIG. 4 is a cross-sectional view showing the installation structure of the antenna element 23a. The antenna element 23a and coaxial cable 22a in FIG. 3 are constructed in the same structure as that of the antenna element 23b and coaxial cable 22b. Accordingly, in FIGS. 2 to 4, the antenna element 23a and coaxial cable 22a can be replaced with the antenna element 23b and coaxial cable 22b. To replace these components, if necessary, the respective components may be replaced as mirror-symmetrical components.

As is shown in FIG. 3, the antenna element 23a has a rectangular parallelepiped shape. This antenna element 23a is installed in each of the left and right side walls of the housing body, at a position behind the palm rest 11, and is sandwiched between the housing base 1A and the housing cover 1B. To install the antenna element, the lengthwise direction of the antenna element 23a is set along the side wall of the housing. In addition, the antenna element 23a is sandwiched between the housing base 1A and the housing cover 1B, such that that side of the element in which an antenna pattern is formed is oriented to be exposed to the outside of the main housing body 1.

An engagement groove 1N is provided in the housing cover 1B. An insertion block 5p of a side cover 5 made of plastic material is engaged in the engagement groove 1N. Side covers 5 are thus attached respectively to the left and right side walls of housing body 1. As a result, the antenna element 23a is protected from external stress by the side cover 5.

The side cover 5 is a member to adjust the electrostatic-capacitance coupling amount among the housing base 1A, the housing cover 1B, and the antenna element 23a. The amount of coupling of the electrostatic capacitance (CP) with the antenna element 23a due to a conductive area of the housing base 1A and the housing cover 1B is adjusted by the dielectric constant of the material which forms the side cover 5, matching of the radiation characteristic is thus achieved. As a result of this, the radiation characteristic of the antenna element 23a is improved.

In this structure, the antenna element 23a is sandwiched between the housing base 1A and the housing cover 1B which are made of conductive material. The conductivity of the housing is hence utilized as a ground plane for the characteristic of the antenna. As a result, the function of shielding against interfering radio waves radiated from other circuit blocks is realized so that the circuit blocks can be prevented from breaking down due to electrostatic discharge.

According to the antenna installation structure as described above, the wireless unit 21 is positioned relatively close to the antenna element 23a and/or 23b in one same housing (housing body 1). The coaxial cable which connects the wireless unit 21 to the antenna element 23a and/or 23b can therefore have a short wiring length. Accordingly, the transmission loss through the coaxial cables 22a and/or 22b can be reduced, and the apparatus housing can be smaller and thinner without enlarging the diameter of the coaxial cable. Also, the antenna elements 23a and/or 23b are sandwiched between the housing base 1A and the housing cover 1B at each side wall of the housing. In other words, the antenna elements 23a and/or 23b are installed in the side walls of the housing body 1. It is therefore not necessary to secure an antenna installation space in the housing but is possible to use effectively the internal space of the housing to be occupied by components. As a result, the apparatus housing can be much smaller and thinner. Besides, the structure of installing the antenna elements 23a and/or 23b can be simplified attaining an economically advantageous structure. In addition, the antenna elements 23a and/or 23b are provided, with the surfaces of their antenna patterns all exposed from the side walls of the housing body 1. An antenna unit with stable and high performance can therefore be realized, without being affected by electromagnetic influences from other components provided inside the housing.

Further, the amount of coupling of the electrostatic capacitance (CP) with the antenna elements 23a and/or 23b from the conductive areas of the housing base 1A and housing cover 1B is adjusted by the dielectric constant of the material forming the side cover 5, so that matching of the radiation characteristic is achieved. The antenna element 23a and/or 23b are thus protected and the radiation characteristic can be improved. In addition, the structure is arranged such that the antenna elements 23a and/or 23b are each sandwiched between the housing base 1A and the housing cover 1B which are made of conductive material. The conductivity of the housing can therefore be utilized as the ground plane for the antenna characteristic. It is hence possible to realize the function of shielding against interfering radio waves radiated from other circuit blocks, and to prevent circuit blocks from breaking down due to electrostatic discharge.

The second embodiment of the present invention will next be described with reference to FIG. 5.

Figure 5:
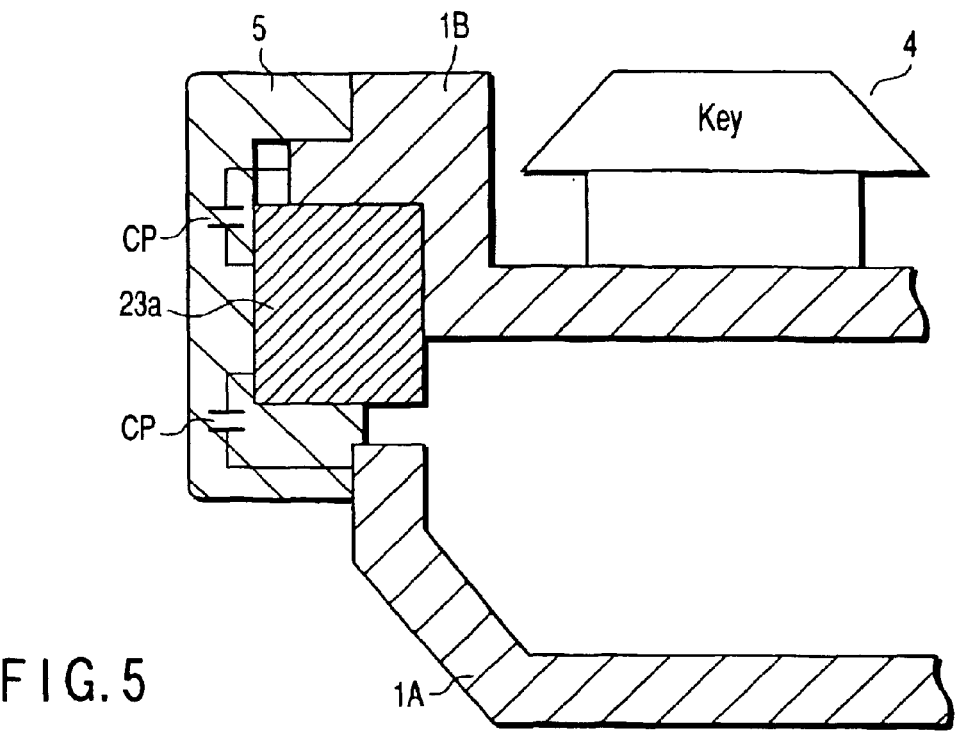
FIG. 5 is a cross-sectional view showing the structure of a main part in a second embodiment of the present invention.

FIG. 5 is a cross-sectional view showing the structure of a main part of the second embodiment according to the present invention. The same components as those of the first embodiment shown in FIGS. 1 to 4 are denoted by identical reference symbols. Detailed explanation of those components will be omitted.

The first embodiment adopts a structure in which the antenna element 23a is sandwiched between the housing base 1A and the housing cover 1B. In the second embodiment shown in FIG. 5, the antenna element 23a is held by the side cover 5, between the housing base 1A and the housing cover 1B which construct left and right side walls of the main housing body 1. The antenna element 23a is thus installed in each side wall of the housing body 1. The antenna element 23a can also be replaced with the antenna element 23b, as in the first embodiment. To replace them, if necessary, the respective components may be replaced as mirror-symmetrical components.

In the structure shown in FIG. 4, the wireless unit 21 and the antenna elements 23a and/or 23b are also provided in one same housing (housing body 1). The coaxial cables 22a and/or 22b which connect the wireless unit 21 to the antenna elements 23a and/or 23b therefore have a short wiring length. Accordingly, the transmission loss through the coaxial cables 22a and/or 22b can be reduced. The apparatus housing hence can be smaller and thinner without enlarging the diameter of the coaxial cable. Also, the antenna elements 23a and/or 23b are sandwiched between the housing base 1A and the housing cover 1B. It is therefore not necessary to secure an antenna-installation space in the housing but is possible to use effectively the internal space of the housing to be occupied by components. As a result, the apparatus housing can be smaller and thinner. Besides, the structure of installing the antenna elements 23a and/or 23b can be simplified to attain an economically advantageous structure.

In addition, the antenna elements 23a and/or 23b are provided, with the surfaces of their antenna patterns all exposed from the side walls of the main housing body 1. An antenna unit with stable and high performance can therefore be realized, without being affected by electromagnetic influences from other components provided inside the housing.

Further, the amount of coupling of the electrostatic capacitance (CP) with the antenna elements 23a and/or 23b from conductive areas of the housing base 1A and housing cover 1B is adjusted by the dielectric constant of the material forming the side cover 5, so that matching of the radiation characteristic is achieved. The antenna element 23a and/or 23b are thus protected and the radiation characteristic can be improved. In addition, the antenna elements 23a and/or 23b are provided, sandwiched between the housing base 1A and the housing cover 1B which are made of conductive material. The conductivity of the housing can therefore be utilized as the ground plane for the antenna characteristic. As a result, the function of shielding against interfering radio waves radiated from other circuit blocks is realized, and circuit blocks are prevented from breaking down due to electrostatic discharge.

The third embodiment of the present invention will be next explained with reference to FIG. 6.

Figure 6:
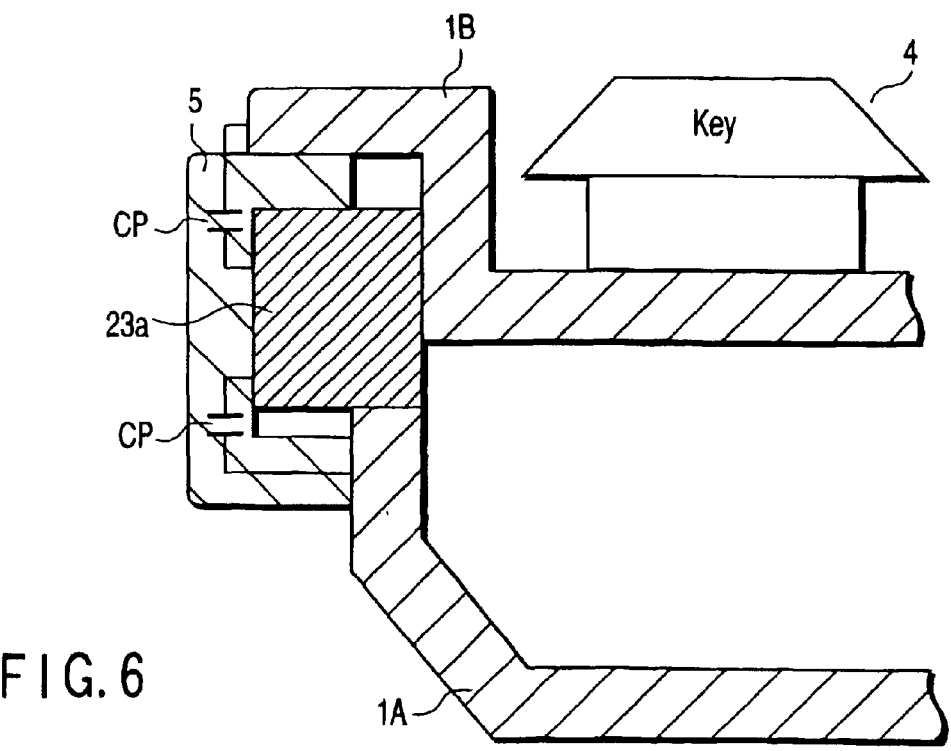
FIG. 6 is a cross-sectional view showing the structure of a main part in a third embodiment.

FIG. 6 is a cross-sectional view showing the structure of a main part of the third embodiment according to the present invention. The same components as those of the first embodiment shown in FIGS. 1 to 4 are denoted by identical reference symbols. Detailed explanation of those components will be omitted.

In the foregoing second embodiment, the antenna element 23a is held by the side cover 5 between the housing base 1A and the housing cover 1B which construct left and side walls of the housing body 1. The antenna element 23a is installed on each side wall of the housing body 1. In contrast, in the present third embodiment, the antenna element 23a is held by the housing base 1A and the side cover 5. The antenna element 23a can also be replaced with the antenna element 23b, as in the first embodiment. To replace them, if necessary, the respective components may be replaced as mirror-symmetrical components.

In the structure shown in FIG. 6, the wireless unit 21 and the antenna elements 23a and/or 23b are provided in one same housing (housing body 1). The coaxial cables 22a and/or 22b which connect the wireless unit 21 to the antenna elements 23a and/or 23b therefore has a short wiring length. Accordingly, the transmission loss through the coaxial cables 22a and/or 22b can be reduced. The apparatus housing can hence be smaller and thinner without enlarging the diameter of the coaxial cable. Also, the antenna elements 23a and/or 23b are sandwiched between the housing base 1A and the housing cover 1B. It is therefore not necessary to secure an antenna-installation space in the housing but is possible to use effectively the internal space of the housing to be occupied by components. The apparatus housing can hence be smaller and thinner. As a result, the structure of installing the antenna elements 23a and/or 23b can be simplified attaining an economically advantageous structure.

In addition, the antenna elements 23a and/or 23b are provided, with the surfaces of their antenna patterns all exposed from the side walls of the main housing body 1. An antenna unit with stable and high performance can therefore be realized, without being affected by electromagnetic influences from other components provided inside the housing.

Further, the amount of coupling of electrostatic capacitance (CP) with the antenna elements 23a and/or 23b from the conductive areas of the housing base 1A and housing cover 1B is adjusted by the dielectric constant of the material forming the side cover 5, so that matching of the radiation characteristic is achieved. The antenna element 23a and/or 23b are thus protected and the radiation characteristic can be improved. In addition, the antenna elements 23a and/or 23b are provided, sandwiched between the housing base 1A and the housing cover 1B which are made of conductive material. The conductivity of the housing can therefore be utilized as the ground plane for the antenna characteristic. As a result, the function of shielding against radio interference from other circuit blocks is realized, and circuit blocks are prevented from breaking down due to electrostatic discharge.

In the embodiments described above, the housing base 1A and the housing cover 1B are each made of conductive material. The structure may, however, be arranged as follows. For example, only the housing base 1A or the housing cover 1B may be made of conductive material, and only the base 1A or cover 1B made of conductive material may be used as the ground plane for the antenna elements 23a and/or 23b.

Alternatively, the housing base 1A or housing cover 1B which constructs the housing body 1 may be made of synthetic resin material. Conductive material may be applied or adhered to both or either one of the base and cover. A conductive part thus applied or adhered may be utilized as the ground plane for the antenna elements 23a and/or 23b.

Also, the foregoing embodiments have been exemplified by a structure (of a diversity antenna) in which one wireless unit 21 is provided with two antenna elements 23a and 23b. The present invention, however, is not limited thereto. For example, the antenna installation structure of the present invention is applicable if one or plural antenna elements 23a and/or 23b be provided in one of the right and left side wall of the housing.

In addition, in each of the embodiments described above, the antenna installation structure of the present invention has exemplified such a housing body to which a display housing is attached rotatably. The present invention, however, is not limited thereto. For example, the present invention is applicable even to an electronic apparatus having a single-housing structure such as PDA.

In the first embodiment, the antenna elements 23a and/or 23b of the wireless unit 21 are held by the housing base 1A and the housing cover 1B at the side walls of the housing. The elements 23a and/or 23b are held by the side cover 5 in the second embodiment, as well as by the housing base 1A and the side cover 5 in the third embodiment. The antenna installation structure, however, is not limited thereto. Between the housing base 1A and the housing cover 1B at the side walls of the housing, for example, the antenna elements 23a and/or 23b may be bonded to both or one of the housing base 1A and the housing cover 1B, to install the antenna elements 23a and/or 23b in the side walls of the housing.

As has been explained above, according to the present invention, antenna elements for a wireless unit can be installed in a structure which is advantageous economically and in performance of the antenna, without involving expansion of the size of the housing.

Additional advantages and modifications will readily occur to those skilled in the art. Therefore, the invention in its broader aspects is not limited to the specific details and representative embodiment shown and described herein. Accordingly, various modifications may be made without departing from the spirit or scope of the general inventive concept as defined by the appended claims and their equivalents.

What is claimed is:

1. An electronic apparatus comprising:
   a housing including a lower case having a side wall and an upper case having a side wall;
   an antenna element sandwiched between the side wall of the lower case and the side wall of the upper case, and having an antenna pattern exposed to the housing;
   a cover attached to the housing and covering the antenna element.

2. An apparatus according to claim 1, wherein one of the lower and upper cases is made of conductive material.

3. An apparatus according to claim 1, wherein one of the lower and upper cases is made of a conductive material, and serves as a ground plane of the antenna element.

4. An apparatus according to claim 3, wherein the cover is made of a non-conductive material said cover being configured to adjust an amount of coupling of electrostatic capacitance between a conductive part of the housing and the antenna element.

5. An apparatus according to claim 1, wherein the cover is detachably provided in the housing.

6. An apparatus according to claim 5, wherein the antenna element is detachably provided in the housing.

7. An apparatus according to claim 1, wherein the antenna element has a rectangular parallelepiped shape, and a lengthwise direction of the antenna element extends along the side walls of the upper and lower cases.

8. An electronic apparatus comprising:
   a housing including a first case having a side wall and a second case having a side wall;
   an antenna element sandwiched between the side walls of the first and second cases and having an antenna pattern exposed to the housing; and
   a cover attached to the housing and covering the antenna element.

9. An apparatus according to claim 8, wherein one of the first and second cases is made of a conductive material.

10. An apparatus according to claim 9, wherein one of the first and second cases is made of a conductive material and serves as a ground plane of the antenna element.

11. An apparatus according to claim 10, wherein the cover is made of a non-conductive material, said cover being configured to adjust an amount of coupling of electrostatic capacitance between a conductive part of the housing and the antenna element.

12. An apparatus according to claim 8, wherein the cover is detachably provided in the housing.

13. An apparatus according to claim 12, wherein the antenna element is detachably provided in the housing.

14. An apparatus according to claim 8, wherein the antenna element has a rectangular parallelepiped shape, and a lengthwise direction of the antenna element extends along the side walls of the upper and lower cases.

15. An electronic apparatus comprising:
   a body including a lower case having a side wall and an upper case having a side wall;
   a display rotatably connected to the body;
   an antenna element sandwiched between the side wall of the lower case and the side wall of the upper case and having an antenna pattern exposed to the body; and
   a cover attached to the body and covering the antenna element.

* * * * *